United States Patent Office 2,907,750
Patented Oct. 6, 1959

2,907,750

POLYURETHANES OF HYDROXYARYL-ALIPHATIC ACID-ALDEHYDE CONDENSATES

Sylvan O. Greenlee, Racine, Wis., assignor to S. C. Johnson & Son, Inc., Racine, Wis.

No Drawing. Application February 21, 1957
Serial No. 641,489

10 Claims. (Cl. 260—51)

This invention relates to novel resinous compositions of matter of the polyurethane type and is directed more particularly to synthetic resinous compositions derived from the reaction of polyisocyanates with a hydroxyaryl-aliphatic acid-aldehyde condensation product.

One of the objects of this invention is to provide a new class of synthetic resinous compositions which are capable of further reaction to give infusible, insoluble materials suitable for use as protective coatings, adhesives, and molding resins.

A further object is the synthesis along the general lines of known reactions of a film-forming product characterized, by virtue of the novel reactants from which it is derived, with improved properties especially as regards resistance to attack by common chemicals, resistance to wear or damage, and resistance to penetration and solvent action by water.

By suitable adjustment of the conditions of the reaction and the ingredients, the product of the invention may be caused to assume a cellular or foam state, and, accordingly, an additional aim of the invention is the provision of light-weight three-dimensional solids possessing good structural strength and, therefore, useful in load-bearing applications.

These and other objects are accomplished by the present invention which contemplates the reaction of a substantial amount of an isocyanate or isothiocyanate, at least half of which must contain two or more isocyanate or isothiocyanate groups per molecule, and the condensation product of an aldehyde with an aliphatic acid, having a total of at least five carbon atoms, one of which is substituted with two hydroxyaryl groups.

It has been found that the reaction of aldehyde-hydroxyaryl-aliphatic acid condensates with polyisocyanates is an unusually advantageous mechanism for obtaining polymeric resinous compositions characterized by excellent protective coating and adhesive properties when used as a film, and high structural strength when cast into foam resin bodies. These condensates are especially adapted for the reaction by virtue not only of the presence in each molecule thereof of a plurality of functional groups reactive with the isocyanates, but because of the novel combination of hydroxyl and carboxyl radicals that make up this plurality of groups. As will be explained more fully, both hydroxyl and carboxyl radicals condense with an isocyanate group and, thus, may serve as reactive foci leading to the formation of a resinous product; in addition, the carboxyl radical in the condensation liberates carbon dioxide which is of assistance in producing foam resin structures. Aldehyde-hydroxyaryl-aliphatic acid condensates useful herein are viscous or soft resinous compositions containing one or more unique symmetrical residues and tend to contribute to the reaction product such properties as outstanding chemical resistance and superior hardness and toughness. Chemical resistance is, for example, of great value in the formulation of protective coatings which are likely to be subjected in the course of ordinary usage to contact with various chemicals. The presence in the resin of residues having a symmetrical structure results in a more rigid product, a feature of much advantage in polyurethane foams.

The hydroxyaryl-aliphatic acids used in the condensation may be, and preferably are, prepared by condensing a phenolic compound with a keto-acid under such conditions that two hydroxyaryl radicals are attached to the same carbon atom of the acid. In order for the yields of this reaction to achieve useful levels, it is necessary, first, that the keto-carbon atom occur at the position adjacent a terminal methyl group, and second, that the keto-acid have at least five carbons in the aliphatic chain. The keto-acid of this type which has only four carbon atoms, aceto-acetic acid, is highly unstable under the conditions necessary for the reaction and does not produce the desired product. The five-carbon acid, levulinic acid, gives excellent yields. Higher acids are apparently useful, but these exist principally as laboratory curiosities and are not available in commercial quantities. There is disclosed in prior copending applications, Serial Nos. 464,607 and 489,300, filed October 25, 1954, and February 18, 1955, respectively, a number of illustrative acids that have been found to be particularly suitable for use, as well as methods of preparing the same. These acids consist of the condensation products of levulinic acid and phenol, substituted phenols, or mixtures of phenol and substituted phenols and shall, for the sake of brevity, be referred to herein as "the Diphenolic Acid."

The term "substituted phenols" is used herein to embrace phenols and phenolic compounds wherein one or more hydrogen atoms of the phenyl nucleus is replaced by an atom or group that does not enter into, or otherwise interfere with, the condensation of the compound with the keto-acid. Thus, for example, the nucleus may be alkylated with a methyl or other alkyl group, preferably having not more than five carbon atoms, as disclosed in the aforementioned application, Serial No. 489,300, or halogenated with bromine, fluorine, chlorine, or combinations thereof, provided that the total number of substituents, including hydroxyl groups, does not exceed three. The Diphenolic Acid derived from substituted phenols, such as the alkylated phenols, are sometimes more desirable than the products obtained from unsubstituted phenols since the alkyl groups tend to provide better organic solvent solubility, flexibility, and water resistance, as well as influencing the nature and extent of subsequent reactions for which the acids are adapted. However, the unsubstituted product is usually more readily purified.

These hydroxyaryl-aliphatic acids react with an aldehyde, formaldehyde for example, to yield initially an alkylol condensation product. This may be illustrated by the following formula of the methylol condensation product of 1 mol of 4.4-bis(4-hydroxyphenyl)pentanoic acid (formed by the addition of phenol and levulinic acid) and 2 mols of formaldehyde:

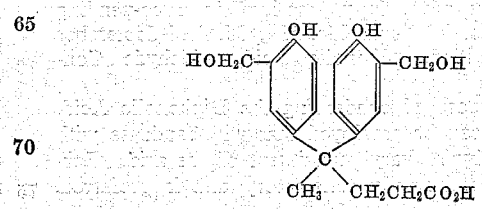

When phenolic compounds condense with aldehydes, the phenolic hydroxyl groups activate the aromatic nuclei at positions that are ortho and para with respect to the hydroxyl groups. The introduction of the aldehyde into the nuclei will, therefore, be at these positions, provided, of course, the carbon atoms there are coupled to hydrogen atoms. 4,4-bis(4-hydroxyphenyl)pentanoic acid has two hydrogenated carbon atoms in each of its two aromatic nuclei, so that up to 4 mols of aldehyde may be reacted readily with each mol of this acid to form an alkylol condensate. In the case of alkyl and halo-derivatives of the acid, i.e. where alkyl groups of halogen atoms have been substituted in the aromatic nuclei of the acid, if appreciable condensation is to take place, the substitution should not be so complete as to remove all hydrogen atoms from the carbon atoms at the ortho and para positions. Upon the application of heat, the methylol groups react further and yield a resinous polybasic hydroxyacid consisting of residues of the acid linked together by methylene radicals. In those cases where the alkylol form is prepared by the introduction of aldehyde at substantially all the free ortho and para positions of the acid, polymerization is accompanied by the splitting off of alkylol groups and the liberation of aldehyde. A typical polymerization reaction of the material of Formula I might be illustrated as follows:

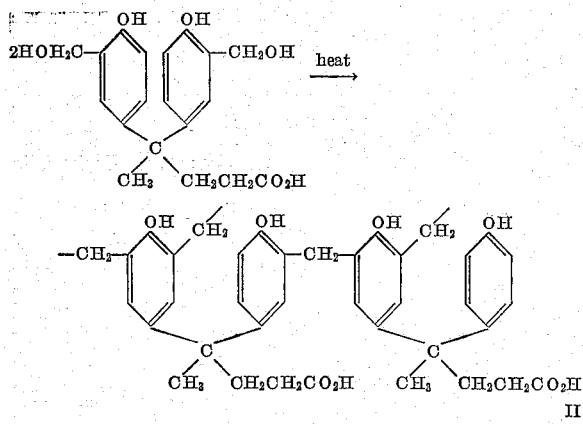

Somewhat different products may be obtained by using the bis-hydroxyaryl-aliphatic acids in combination with other mononuclear, polynuclear, monohydric, or polyhydric phenols. Such materials are exemplified by phenol, the cresols, the xylenols, butylphenol, the naphthols, and bis(4-hydroxyphenyl)isopropylidene. These phenolic compounds may be partially condensed with an aldehyde, and then admixed with a partially condensed mixture of Diphenolic Acid and aldehyde to yield further valuable complex condensation products. Alternatively, these phenols may be added to the initial reaction mixture of bis-hydroxyaryl-aliphatic acid and aldehyde to yield after condensation a slightly modified product. The phenol-aldehyde condensates contain carboxyl groups in addition to alkylol hydroxyl groups and phenolic hydroxyl groups. In the more highly condensed form, where most of the alkylol groups have been dehydrated to form methylene linkages, the compositions contain primarily phenolic hydroxyl groups and carboxyl groups. These phenol-aldehyde condensates and their preparation are more fully described in a co-pending Greenlee application Serial No. 534,405, filed September 14, 1955, entitled, "Phenolic Acid, Aldehyde Condensates."

For the purpose of condensing the Diphenolic Acid, any aldehyde can be employed that will condense with the particular hydroxyaryl substituent of the acid. Formaldehyde is universally satisfactory and is preferred. It may be in the form known as formalin, a 40% aqueous solution. Formaldehyde engendering compounds, such as para-formaldehyde, trioxymethylene, and hexamethylene tetramine are also particularly suitable.

The resinous Diphenolic Acid-aldehyde condensates may conveniently be used at any stage of condensation, thus providing one wishing to formulate infusible, insoluble products with a broad range of starting materials. The condensate may be the initial reaction product consisting primarily of alkylol Diphenolic Acid, i.e. an A-stage resin, in which case, it would be essentially a monomer containing one carboxylic acid group, two phenolic hydroxyl groups, and one or more alcoholic hydroxyl groups per molecule. This initial aldehyde condensate may, on the other hand, be heated to couple the Diphenolic Acid nuclei and form, as a B-stage resin, a polybasic acid containing phenolic and alcoholic hydroxyl groups. All of these condensates will have substantially two phenolic hydroxyl groups for each carboxylic acid group, since so far as it can be determined the phenolic hydroxyl groups, as such, are little involved in the linking together of Diphenolic Acid molecules during condensation. The condensation must not, of course, be allowed to proceed to a point where the product is insoluble with the isocyanates with which it is to be reacted and certainly not to a C-stage resin that is insoluble and infusible. The extent of condensation should also be such as not to restrict the solubility of the product in solvents which might be used in applying a mixture of a Diphenolic Acid-aldehyde condensate and an isocyanate, as in the formation of a protective coating film.

The other component of the reaction of the present invention is an isocyanate or isothiocyanate compound. In order that a resinous product be obtained, the isocyanate or isothiocyanate compound must contain two or more isocyanate or isothiocyanate groups, a plurality of functions being essential if a chain or cross-linked structure is to be developed by condensation with the functional groups of the Diphenolic Acid. Accordingly, the principal reaction contemplated herein may be described as between a Diphenolic Acid-aldehyde condensate and a polyisocyanate having the general formula $R(NCX)_z$, where X is a chalcogen having an atomic weight less than 33, i.e., oxygen or sulfur; $z$ is an integer of more than one; and R is a polyvalent organic radical with the number of valences being equal to $z$. There are numerous compounds coming within this formula that are suitable for the reaction and no attempt will be made to give an exhaustive list. The following are considered illustrative and will suggest to the expert a variety of others: alkylene diisocyanates; such as ethylene diisocyanate, trimethylene diisocyanate, tetramethylene diisocyanate, hexamethylene diisocyanate, decamethylene diisocyanate, and their corresponding sulfur analogues; cyclo-alkylene diisocyanate, such as cyclopentylene diisocyanate, cyclohexylene diisocyanate, and their corresponding sulfur analogues; aromatic diisocyanates, such as m-phenylene diisocyanate, naphthalene diisocyanate, diphenyl-4,4'-diisocyanate, and their corresponding sulfur analogues; aliphatic-aromatic diisocyanates, such as xylene-1,4-diisocyanate, diphenylene methane diisocyanate and their corresponding sulfur analogues; hetero- diiso- and diisothiocyanates, such as $SCNCH_2OCH_2NCS$ and $SCNCH_2SCH_2NCS$; and isocyanates and isothiocyanates having more than two isocyanate or isothiocyanate groups, such as benzene 1,2,4-triisocyanate, 1,2,2-triisocyanatobutane, and toluene triisocyanate. From among these and other polyisocyanates and polyisothiocyanates, the following are preferred largely by reason of their ready commercial availability: toluene 2,4 diisocyanate, toluene 2,6 diisocyanate, methylene bis (4-phenyl isocyanate), 3,3' bitolylene 4,4' diisocyanate, and hexamethylene diisocyanate. In order to simplify the remainder of the discussion, the repetitious recital of both the oxygen and sulfur forms will be dispensed with; only the oxygen compound will be given but will be understood as embracing the corresponding sulfur analogue.

While, as has already been mentioned, the principal reaction requires a polyisocyanate compound, it is desirable for certain applications to modify the product by using, in addition, a minor portion of a monoisocyanate. Some of the reaction products of Diphenolic Acid with polyisocyanates alone are brittle infusible products; on the other hand, flexible infusible products may be frequently obtained by the addition to the reaction mixture of a proper amount and type of monoisocyanate. Examples of suitable monoisocyanate are octadecylisocyanate, hexyl isocyanate, phenyl isocyanate and naphthalene isocyanate, to mention just a few of the simpler compounds. Flexibility is particularly apparent where long-chain compounds, i.e., having more than 11 carbons, are employed. Unsaturated monoisocyanates are also suitable and provide an additional aid to conversion or curing. The amount of the monocompound that is added to the acid and polyisocyanate as a modifier will vary depending upon the characteristics described in the product. As a general rule, there should be present a greater amount of the poly-compound that the monocompound, which is to say, that the monoisocyanate should be less than 50% of the total of all isocyanates in the reaction mixture. If a more rigid, brittle material is sought, the quantity of the mono-form should be decreased while, if more flexibility is the desideratum, it should be increased toward the upper limit just mentioned. The functional group of the mono-form may react with the carboxyl or hydroxyl groups of the condensate to reduce cross-linking between adjacent molecules of the polymer and thereby enhance the softness and pliability of the product in proportion to the amount present, or a functional group of one or more molecules of the monoisocyanate may react with methylol groups of the condensate, and, thus, preclude further growth of the chain.

The general chemistry of the present reaction appears to be basically simple. It is well known that isocyanates react with both phenolic hydroxyl groups and carboxylic acid groups. The reaction of a diisocyanate, $R'(NCO)_2$, with a phenolic or aliphatic hydroxyl compound ROH, proceeds in the following manner:

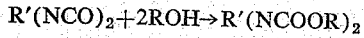

$$R'(NCO)_2 + 2ROH \rightarrow R'(NCOOR)_2$$

In similar fashion, the reaction between a diisocyanate and a carboxylic acid, RCOOH, is as follows:

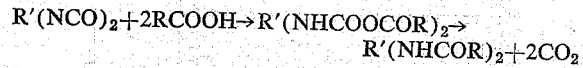

$$R'(NCO)_2 + 2RCOOH \rightarrow R'(NHCOOCOR)_2 \rightarrow R'(NHCOR)_2 + 2CO_2$$

It will be seen that, if the phenolic compound contains two hydroxyl groups or if the carboxylic acid contains two acid groups, the resulting product in either case would be polymeric. Likewise, it will be observed that if a compound is used containing both carboxyl groups and phenolic hydroxyl groups, there is the possibility of simultaneous reaction of both with the isocyanate to give polymeric compounds. It will also be observed that the reaction with a carboxyl-containing compound gives, as a by-product of the reaction, carbon dioxide which may be used to form cellular structures in those reaction products which are intended to be three-dimensional structures.

Applying these general considerations to the reactants proposed herein, a Diphenolic Acid-aldehyde condensate and a polyisocyanate $R(NCO)_2$, it will be appreciated that the directions in which the reaction might go are too varied to be readily illustrated. An isocyanate residue may bridge phenolic or methylol hydroxyl groups of two molecules of the condensate, carboxyl groups of two molecules, or a hydroxyl group of one and a carboxyl group of another. The nature and extent of the reactions which actually occur are somewhat dependent upon the amount of isocyanate available for reaction and the distribution of the isocyanate molecules among the condensate molecules. The choice of relative proportions of condensate and polyisocyanate is dictated principally by the nature of the ultimate product to be obtained. Experience has indicated that a product having useful characteristics attribute to both reactants is obtained generally at a ratio of equivalent weights of condensate to polyisocyanate within the range of 1:5 to 5:1. From a consideration of the reaction, it will be understood that the optimum situation usually prevails where all of the functional groups of the condensate are reacted with the functional groups of th polyisocyanate. For this reason, a preferred range is 2:1 to 1:2 of condensate to isocyanate on equivalent basis with a 1:1 ratio being most desired. As a general rule, it can be postulated that as the proportion of condensate is increased, the polymer becomes more rigid and hard while, conversely, as the proportion of isocyanate is increased, the polymer becomes more flexible, this being particularly true where the functional groups of the isocyanate are separated by fairly long chains so that the acid nuclei are spaced relatively large distances apart within the molecule of the polymer, which thus assumes a more or less linear configuration. On the other hand, where the isocyanate is of a tightly knit, cyclic structure, the tendency is toward enhanced rigidity and brittleness.

If a monoisocyanate —RNCX— is employed along with the polyisocyanate, the number of reactive foci of the condensate available to the functional groups of the poly-compound is lessened. In arriving at the amounts of reactants to be utilized, the mono-compound must therefore be considered, and in such case the equivalent weight of the isocyanate is the total of the equivalent weights of the mono- and poly-compounds.

In general, the procedure by which protective coating films and molding compositions are prepared in accordnace with the present invention involves merely the addition at ordinary temperatures of the condensate to the isocyanate, admixing and converting the mixture by exposure either to normal temperatures or to heat. In some cases, it is desirable to dilute either or both of the reactants, e.g., to lower the viscosity of the mixture and, thus, vary the film thickness of a single coat. Any solvent that is inert to both the condensate and isocyanate may be used, an example being methyl ethyl ketone among many others. The mixture of reactants, either diluted or not, has been found to be quite stable for moderate periods at normal temperatures. Such stability is a feature of some importance as it permits large quantities of the mixture to be made up at one time and then used as needed. For heat cure, temperatures of about 85–225° C. for times of about one hour to about five minutes have been found satisfactory. For a normal temperature cure, it is preferred that any of the well known conversion catalysts for reactions of this type, such as triethanolamine, be added in small amounts in order to reduce the amount of time needed for the film to harden. When early conversion is of no special advantage, the catalyst may be dispensed with. As the examples show, the characteristics of the cured films vary somewhat with the type and amount of the isocyanate employed, with some being better than others, as would ordinarily be expected. As a whole, however, the films possess characteristics that compare favorably with many other available materials so that the product of the invention is quite useful for a variety of purposes.

Where solid foam or cellular structures are desired, they may be obtained by mixing the condensate with a suitable conversion catalyst, of which triethanolamine is again an example, in an appropriate reaction vessel, adding the isocyanate while agitating, allowing the mixture to foam unimpeded, and converting by heating, as in a draft oven, at a temperature of about 85–150° C. or more for from about 5–30 minutes, or by normal temperatures for much longer periods. Although not essential, it is usually desirable to employ an emulsifier in order to obtain a more homogeneous mixture of the reactance. The instant process may be carried out readily in any system which provides for stirring and has sufficient space for the foaming action to proceed unhindered. A modification of a unit currently used in commercial urethane foam production may be employed. Such a system comprises two supply tanks connected to a pressure-mixing nozzle by suitable feed lines. One tank contains the isocyanate and the other tank, which may have to be heated, contains the condensate emulsified with the emulsifying agent and catalyst. The condensate and isocyanate are fed from the tanks to the nozzle where they are mixed under pressure and flowed into pans where the foaming reaction is allowed to proceed unhindered. Again, the foams may be cured in a suitable draft oven at elevated temperatures, thus accelerating the operation. Although the foams may be cured by exposure to normal temperatures as in the case of the films, this considerably prolongs the curing time and a heat cure is preferred.

As has already been briefly mentioned, the Diphenolic Acid-aldehyde condensate lends itself especially well to the formation of urethane foams by reason of the carboxyl group or groups which it contains. Such groups in the course of the reaction decompose to form gaseous carbon dioxide which bubbles through the mixture to produce a cellular structure. Thus, a foaming medium is inherently present, eliminating the need, in most instances, of an external foaming agent. Occasionally, it proves advantageous to add small amounts of water, say up to about 5% by weight of the mixture, to assist in the foaming action. The density of the foams made as described herein varies not only with the particular isocyanate selected for reaction but with the temperature of the conversion as well. It has been found that as the temperature of this stage is increased, the density of the foam also increases, due presumably to the increased loss of $CO_2$ from the mixture at the higher temperatures.

The toughness and rigidity contributed by the Diphenolic Acid condensates are especially significant in the case of foam structures which have, in the past for the most part, been rather soft, spongy texture. These characteristics, together with the resistance to water and common chemicals that the present foams exhibit as well as a very low density when compounded to this end, constitute a rather exceptional combination in this field, so that the present invention should be particularly valuable in producing foam solids for such uses as insulation, crash linings for vehicles, aircraft, etc., and structural components alone or in conjunction with outer coverings of wood or metal.

For the sake of brevity as well as convenience, most of the remainder of this disclosure will be presented in the form of three tables, the first two giving examples of the reactants, along with some of their pertinent properties and the third providing working examples of the invention in the coating field.

The acid condensates mentioned in Table I were all prepared in accordance with the following procedure. A mixture of 3 mols of the specified monohydric phenol, 1 mol of levulinic acid, and 250 parts of 37% aqueous hydrochloric acid was agitated at 50° C. for 72 hours. The upper organic layer was removed from the aqueous HCl by decantation. The product was then subjected to vacuum distillation, using a water aspirator, at a pressure of 15 to 30 mm. with the application of heat until the temperature had reached 165–170° C., thereby removing volatile materials including any unreacted HCl, water, and major portion of unreacted phenol and some of the unreacted levulinic acid. Vacuum distillation was continued using a vacuum pump system which reduced the pressure down to 1 mm. of mercury, while the reaction temperature was gradually raised to 200° C., heating in the range of 170–200° C. extending over a period of around 45 minutes.

TABLE I

*Representative diphenolic acid-aldehyde condensate*

| No. | Condensate | Abbreviation | Isocyanate equivalent (observed) |
|---|---|---|---|
| 1 | Condensation of alkyl diphenolic acid and formaldehyde with alkaline catalyst: A mixture of 314 parts of the Diphenolic Acid obtained from ortho-cresol and levulinic acid and having an acid value of 139 and a saponification value of 192, 172 parts of formalin (38% aqueous formaldehyde), and 15 parts of sodium hydroxide as a 10% aqueous solution was placed in a 3-necked reaction flask provided with a mechanical stirrer, a reflux condenser, and a thermometer. With continuous agitation the temperature was gradually raised to 100° C. and held at this temperature for 1 hour and 20 minutes. The water was then removed by vacuum distillation at a pressure of 20–30 mm. using a water aspirator pump, the charge being heated to 96° C. during the distillation. The residual aldehyde condensate amounted to 360 parts. | AC1 | 52.6 |
| 2 | Condensation of DPA [1] and formaldehyde with alkaline catalyst: A mixture of 286 parts of Diphenolic Acid from 3 mols of phenol and 1 mol of levulinic acid, having an acid value of 141 and a saponification value of 201, 258 parts of formalin, and 15 parts of 10% aqueous sodium hydroxide was heated with continuous agitation as in No. I at a temperature of 100° C. for 1 hour. The water was removed by vacuum distillation at a pressure of 20–30 mm. with the temperature rising to 92° C. during the final distillation. The residual aldehyde condensate amounted to 352 parts. | AC2 | 50.2 |
| 3 | Condensation of excess DPA and formaldehyde: A mixture of 626 parts of the Diphenolic Acid obtained from 3 mols of phenol and 1 mol of levulinic acid, having an acid value of 153 and a saponification value of 204, and 350 parts of formalin was heated at 100° C. with continuous agitation for a period of 1 hour and 30 minutes. The water was removed by distillation at a pressure of 20–30 mm. using an aspirator pump. The residual aldehyde condensate amounted to 732 parts. | AC3 | 133.2 |
| 4 | Condensation of DPA, bis-phenol and formaldehyde with acid catalyst: A mixture of 429 parts of a Diphenolic Acid obtained from 3 mols of phenol and 1 mol levulinic acid, having an acid value of 152 and a saponification value of 208, 342 parts of bis(4-hydroxyphenyl)dimethyl methane, 480 parts of formalin, and 1.92 parts of oxalic acid was heated at 100° C. for a period of 1 hour and 10 minutes, with continuous agitation. The water layer was removed by decantation and the organic resin layer washed 3 times with hot water. The organic resin layer was then freed from the last traces of water by vacuum distillation at a pressure of 20–30 mm., using a water aspirator pump, and a temperature of 84° C. The resulting product amounted to 912 parts. | AC4 | 123.9 |
| 5 | Condensation of alkyl diphenolic acid and formaldehyde with acid catalyst: A mixture of 157 parts of the Diphenolic Acid used in No. I, 86 parts of formalin, and 0.35 part of oxalic acid was heated with continuous agitation at 100° C. for 1 hour. The water layer was removed by decantation and the phenolic resin layer washed 3 times with hot water. The residual resin layer was dried by vacuum distillation at a pressure of 20–30 mm., using a water aspirator pump, with the temperature rising to 100° C. The product amounted to 176 parts. | AC5 | 112 |
| 6 | Condensation of alkyl diphenolic acid and formaldehyde with acid catalyst: A mixture of 157 parts of a Diphenolic Acid obtained by the reaction of 3 mols of metacresol with levulinic acid, having an acid value of 165, 86 parts of formalin, and 0.35 part of oxalic acid was heated at 100° C. with continuous agitation for a period of 1 hour. The water layer was removed by decantation and the phenolic resin layer washed 3 times with hot water. The residual resin layer was finally dried by vacuum distillation at a pressure of 20–30 mm., using a water aspirator pump, while heating to 93° C. The product amounted to 164 parts. | AC6 | 191 |

[1] DPA is an abbreviation for 4,4-bis(4-hydroxyphenyl)pentanoic acid.

It will be observed that an isocyanate equivalent is specified for each acid. The isocyanate equivalent is defined as the weight of the acid which will react with one equivalent of the isocyanate and will be of assistance in selecting actual amounts of the acid that should be used. The method used in determining the observed values as listed involves reacting a sample of the acid with an excess of toluene-2,4-diisocyanate and then determining the excess isocyanate by reaction with di-n-butylamine. Specifically, the technique used is as follows:

To 25 ml. of methyl isobutylketone is added 3 grams of toluene-2,4-diisocyanate previously standardized against di-n-butylamine and a weight of the acid such that the diisocyanate is present in approximately 100% excess. To this mixture is added triethylamine in an amount equal to 1% of the total weight of isocyanate and the acid. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed to the boiling point, allowed to stand for one hour at which point 75 ml. of methanol is added, and the excess di-n-butylamine back-titrated with 1 N alcoholic hydrochloric acid. By carrying out the preparation of the acids with great care, values at or approaching the theoretical can be achieved.

The acid number given for each acid has its usual meaning, which is the number of milligrams of potassium hydroxide necessary to neutralize the acid content of one gram of the sample, and provides an indication of the degree of acidity of the product.

TABLE II

*Representative isocyanates*

| Commercial source, trade name, and abbreviation | Structure | Amine equivalent | |
| --- | --- | --- | --- |
| | | Observed | Theory |
| E. I. du Pont de Nemours & Co., Inc.; Hylene T; Hy T | 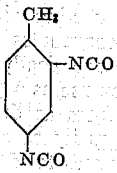 Toluene-2,4-diisocyanate | 90.62 | 87.07 |
| E. I. du Pont de Nemours & Co., Inc.; Hylene M; Hy M | 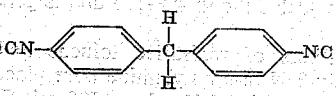 Methylene bis(4-phenyl isocyanate) | 139.98 | 125.12 |
| National Aniline Div.; Nacconate 200; N 200 | 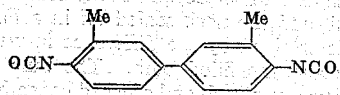 3,3'-Bitolylene-4,4'-diisocyanate | 132.78 | 132.13 |
| Mobay Chemical Co.; Mondur N5; MO N5 | 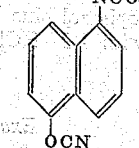 Naphthylene-1,5-diisocyanate | 116.58 | 105.09 |
| Mobay Chemical Co.; Mondur TM; MO TM | 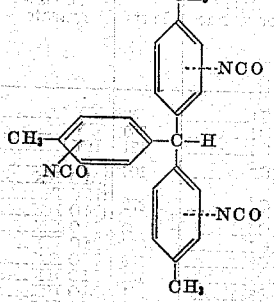 Tritolylmethane triisocyanate | 107.78 | 123.45 |
| Mobay Chemical Co.; Mondur HX; MO HX | OCN(CH$_2$)$_6$NCO<br>Hexamethylene diisocyanate | 103.39 | 84.01 |
| Mobay Chemical Co.; Mondur P; MO P | 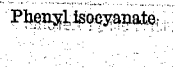 Phenyl isocyanate | Approx. 119 | 119 |

TABLE II—Continued

Representative isocyanates—Continued

| Commercial source, trade name, and abbreviation | Structure | Amine equivalent Observed | Amine equivalent Theory |
|---|---|---|---|
| Mobay Chemical Co.; Mondur NP; MO NP | 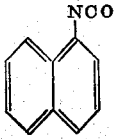 Naphthyl isocyanate | Approx. 169 | 169 |
| Shell Development Co.; Durenediisocyanate; Dur | 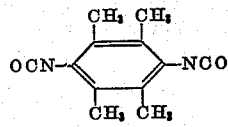 2,3,5,6-tetramethyl-1,4-benezene diisocyanate | 111.22 | 108.12 |

It will be noted that an observed and theoretical amine equivalent is specified for each isocyanate. The amine equivalent refers to the weight of the isocyanate containing one isocyanate group and reacting with one mole of di-n-butylamine. Since the isocyanates available commercially are not necessarily chemically pure, the observed values were obtained for use as a guide in formulating reaction products therefrom as these values provide a measure of the actual purity of each compound.

The analytical procedure used to determine amine equivalents of diisocyanates is found in Monsanto Chemical Company's Technical Bulletin #P-125 and is generally as follows:

Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference in weight between the empty and the filled bulb. The bulb was immersed in the Erlenmeyer flask and crushed beneath the surface of the liquid. The solution was heated to boiling and allowed to cool 1 hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled $H_2O$. The average precision demonstrated by these determinations was ±1.29%.

The following examples, presented in tabular form to conserve space, illustrated the conversion of mixtures of Diphenolic Acid and polyisocyanates alone and modified with a monoisocyanate to insoluble, infusible products. Each of the acid condensates was dissolved in the specified amounts in the designated solvent to a non-volatile content of 40–60%. The isocyanates were used undiluted. The mixtures obtained by adding all the ingredients together were applied to glass panels at .002" wet film thickness. The table gives the heat treatment used for conversion. All parts are by weight.

It will be understood that certain tabulated examples are superior in some respects to other examples, the purpose of the table is to give an indication of the properties possible with varying compositions. With a particular application in mind, the composition may be formulated accordingly to obtain the desired characteristics. In Table III, Examples XII, XIII, XIV and XVI have been found to be particularly well-suited for protective coatings.

TABLE III

Examples of the invention as a coating

| Ex. No. | Acid condensate | Parts | Polyisocyanate | Parts | Monoisocyanate | Parts | Solvent | Conversion Time (hrs.) | Conversion Temp., °C. | Withstood in hours $H_2O$ at 100° C. | Withstood in hours 5% aqueous NaOH at 25° C. |
|---|---|---|---|---|---|---|---|---|---|---|---|
| I | AC1 | 53 | HY T | 91 | | | MEK[1] | 0.5 | 175 | 12 | 2.0 |
| II | AC4 | 380 | HY T | 71 | | | MEK[1] | 0.5 | 175 | 8 | .08 |
| III | AC4 | 124 | HY T | 272 | | | MEK[1] | 0.5 | 175 | 1 | .5 |
| IV | AC2 | 100 | HY T / MO HX | 91 / 103 | | | MEK[1] | 0.5 | 175 | 15+ | 6.0 |
| V | AC4 | 372 | HY T / MO HX | 91 / 103 | MON P | 125 | MEK[1] | 0.5 | 175 | 16+ | 1.5 |
| VI | AC3 | 133 | MO HX | 310 | | | MEK[1] | 0.5 | 175 | 1.5 | .5 |
| VII | AC5 | 224 | MO HX | 103 | | | MEK[1] | 0.5 | 175 | 16+ | .5 |
| VIII | AC3 | 133 | MO HX | 72 | MO P | 63 | MEK[1] | 0.5 | 175 | 16+ | 6.0 |
| IX | AC2 | 151 | MO HX | 103 | MON P | 125 | MEK[1] | 0.5 | 175 | 16+ | 1.0 |
| X | AC3 | 261 | MO HX | 103 | | | MEK[1] | 0.5 | 175 | 10 | 5 |
| XI | AC4 | 224 | MO HX | 520 | | | MEK[1] | 0.5 | 175 | 16.5+ | 13.5+ |
| XII | AC2 | 50 | MO HX | 103 | | | MEK[1] | 0.5 | 175 | 16+ | 8 |
| XIII | AC4 | 247 | MO HX | 140 | | | MEK[1] | 0.5 | 175 | 16+ | 13.5+ |
| XIV | AC3 | 133 | MO HX | 72 | MON P | 38 | MEK[1] | 0.5 | 175 | 16+ | 1.5 |
| XV | AC4 | 124 | MO TM | 1078 | | | MEK[1] | 0.5 | 175 | 16+ | 8 |
| XVI | AC5 | 248 | N 200 | 133 | | | MEK[1] | 0.5 | 175 | 16+ | 3.5 |
| XVII | AC6 | 192 | N 200 | 398 | | | MEK[1] | 0.5 | 175 | .5 | .12 |
| XVIII | AC6 | 384 | MO N5 | 117 | | | MEK[1] | 0.5 | 175 | .75 | .12 |
| XIX | AC1 | 53 | HY M | 70 | | | MEK[1] | 0.5 | 175 | 16 | 6.5 |

[1] MEK is abbreviation for methyl ethyl ketone.

In order to demonstrate preparation of foam resin structures in accordance with the invention, the following examples were prepared:

EXAMPLE XX 526 parts of the acid condensate 1 were heated until melted and thereafter mixed with 26 parts of polyoxyethylene sorbitan mono-oleate, an emulsifier sold under the trade-name Tween 80 by Atlas Powder Company, and 3.6 parts of triethylamine to form a homogeneous mixture. Then, 906 parts of toluene-2,4-diisocyanate were stirred into the mixture while the latter was maintained at 110° C. The evolution of foam occurred almost instantaneously and the mixture solidified within a short time, although heating was continued for about 5 minutes to insure that a complete cure had been obtained. The result was a dark brown, brittle, rigid foam having cells of irregular size dispersed throughout.

EXAMPLE XXI

Example XX was repeated except that 1034 parts of hexamethylene diisocyanate were employed as the isocyanate. The product was a yellow, hard, rigid, tough foam having an irregular cell structure.

EXAMPLE XXII

Example XX was repeated except that 1400 parts of methylene bis(4-phenyl isocyanate) were employed as the isocyanate. The resultant foam was similar in characteristics to that of Example XXI except for its black color.

EXAMPLE XXIII

Example XX was repeated except that 620 parts of the acid condensate AC 4 were substituted, the amount of the isocyanate was decreased to 453 parts and the amount of the emulsifier was increased to 31 parts. The foam that was produced was rigid, tough and brittle, with a yellow color and an irregular cell structure.

The aforegoing examples, both as to films and foams, are furnished only for the guidance of those seeking to practice the invention and not for the purpose of defining the boundaries in which it is operative. The numerous other embodiments are possible and will be suggested by these relatively few illustrations.

Although the examples describe the preparation of products in which the reaction is allowed to proceed to the point where the product is infusible and insoluble, it will be appreciated that the reaction could be terminated short of this point to yield intermediate products. For certain applications, it may be desirable to carry the reaction to an intermediate stage and effect the final cure by exposure either to room temperature for a long period of time or to a further heat treatment. It will also be understood that although the examples in the tables were converted to the insoluble, infusible state by means of heat, this was done largely in the interest of saving time and the same result can ordinarily be obtained at room temperature for much longer periods of time.

It is contemplated by the invention that various inactive ingredients, such as fillers, pigments and plasticizers can be added to the reaction mixture to modify the product in known ways. For example, the admixture of a pigment would be suggested where the product was to be used as a decorative coating as a replacement for paint. Inert fillers, such as siliceous and metallic powders might be added where the specific application demands a product having unusual structural strength or resistance to heat.

It is claimed and desired to secure by Letters Patent:

1. A new composition of matter comprising a polyurethane condensation product of (A) a compound of the general formula $R(NCX)_z$, wherein R is an organic radical having a valency equal to $z$, X is a chalcogen having an atomic weight of less than 33, and $z$ is an integer having a value of more than 1; and (B) a resinous polybasic acid which is the condensation product of (a) formaldehyde and (b) a pentanoic acid consisting essentially of 4,4 bis(4-hydroxyaryl)pentanoic acid, wherein the hydroxyaryl radical is a hydroxyphenyl radical and is free from substitutents other than alkyl groups of from 1 to 5 carbon atoms, with said hydroxyphenyl radical having hydrogen on at least one position ortho to the hydroxyl, wherein the ratio of (a) to (b) is from 1 to 4 moles of (a) per mole of (b), and having a ratio of (A) to (B) of from 1:5 to 5:1 on an equivalent weight basis.

2. A new composition of matter comprising a polyurethane condensation product of (A) a compound selected from the class consisting of organic polyisocyanates antd polyisothiocyanates; and (B) a resinous polybasic acid which is the condensation product of (a) formaldehyde and (b) 4,4 bis(4-hydroxyphenyl)-pentanoic acid wherein the ratio of (a) to (b) is from 1 to 4 moles of a (a) per mole of (b), and having a ratio of (A) to (B) of from 1:5 to 5:1 on an equivalent weight basis.

3. The composition of claim 1 wherein (A) and (B) are reacted in amounts on an equivalent weight basis having a ratio of (A) to (B) of from 1:2 to 2:1.

4. A new composition of matter comprising a polyurethane condensation product of (A) a compound of the general formula $R(NCX)_z$, wherein R is an organic radical having a valency equal to $z$, X is a chalcogen having an atomic weight of less than 33, and $z$ is an integer having a value of more than 1; (B) a resinous polybasic acid which is the condensation product of (a) formaldehyde and (b) a pentanoic acid consisting essentially of 4,4 bis(4-hydroxyaryl)pentanoic acid, wherein the hydroxyaryl radical is a hydroxyphenyl radical and is free from substitutents other than alkyl groups of from 1 to 5 carbon atoms, with said hydroxyphenyl radical having hydrogen on at least one position ortho to the hydroxyl, wherein the ratio of (a) to (b) is from 1 to 4 moles of (a) per mole of (b) and having a ratio of (A) to (B) of from 1:5 to 5:1 on an equivalent weight basis; and (C) up to about 5% of the total weight of (A) and (B) of water.

5. A method of preparing a new composition of matter which comprises admixing (A) a compound of the general formula $R(NCX)_z$, wherein R is an organic radical having a valency equal to $z$, X is a chalcogen having an atomic weight of less than 33, and $z$ is an integer having a value of more than 1; (B) a resinous polybasic acid which is the condensation product of (a) formaldehyde and (b) a pentanoic acid consisting essentially of 4,4 bis(4-hydroxyaryl)pentanoic acid, wherein the hydroxyaryl radical is a hydroxyphenyl radical and is free from substitutents other than alkyl groups of from 1 to 5 carbon atoms, with said hydroxyphenyl radical having hydrogen on at least one position ortho to the hydroxyl, wherein the ratio of (a) to (b) is from 1 to 4 moles of (a) per mole of (b), and having a ratio of (A) to (B) of from about 1:5 to 5:1, and converting said mixture to an insoluble infusible resin.

6. A method of claim 5 wherein said mixture is converted by air drying at room temperature.

7. The composition of claim 1 where the pentanoic acid of (B) consists essentially of 4,4 bis(4-hydroxyaryl)pentanoic acid wherein the hydroxyaryl radical is a hydroxpyhenyl radical and is free from substituents other than alkyl groups of one carbon atom.

8. The composition of claim 1 wherein R of (A) is an organic aromatic radical.

9. The composition of claim 1 wherein R of (A) is an organic aliphatic radical.

10. A new composition of matter comprising a polyurethane condensation product of (A) a mixture of organic monoisocyanates and polyisocyanates wherein at least 50% of the mixture is a polyisocyanate and (B) a resinous polybasic acid which is the condensation product of (a) formaldehyde and (b) a pentanoic acid consisting essentially of 4,4 bis(4-hydroxyaryl)pentanoic acid, wherein the hydroxyaryl radical is a hydroxyphenyl radical and is free from substituents other than alkyl groups of from 1 to 5 carbon atoms, with said hydroxyphenyl radical having hydrogen on at least one position ortho to the hydroxyl, wherein the ratio of (a) to (b) is from 1 to 4 moles of (a) per mole of (b), and having a ratio of (A) to (B) of from 1:5 to 5:1 on an equivalent weight basis.

References Cited in the file of this patent

FOREIGN PATENTS 901,768     France _____ Aug. 6, 1945

OTHER REFERENCES

Bader et al.: "Jour. Am. Chem. Soc.," vol. 76, pages 4465–4466. (Copy in Sci. Libr.)

UNITED STATES PATENT OFFICE
CERTIFICATE OF CORRECTION

Patent No. 2,907,750                                      October 6, 1959

Sylvan O. Greenlee

It is hereby certified that error appears in the printed specification of the above numbered patent requiring correction and that the said Letters Patent should read as corrected below.

Column 2, line 59, for "4.4-bis" read -- 4,4-bis --; column 4, line 72, for "4.4′" read -- 4,4′ --; column 6, line 11, for "th" read -- the --; lines 35 and 36, for "accordnace" read -- accordance --; column 7, lines 1 and 2, for "reactance" read -- reactants --; column 8, Table I, the italicized heading thereof, for "Representative diphenolic acid-aldehyde condensate" read -- Representative Diphenolic Acid-aldehyde condensate --; same column 8, same Table I, second column thereof, lines 10, 53, and 62, for "diphenolic acid", each occurrence, read -- Diphenolic Acid --; column 13, lines 65 and 66, for "produce" read -- product --.

Signed and sealed this 4th day of October 1960.

(SEAL)
Attest:

KARL H. AXLINE
Attesting Officer

ROBERT C. WATSON
Commissioner of Patents